Dec. 10, 1957   M. FLEISCHMANN   2,816,212
ELECTRIC WELDING APPARATUS
Filed May 4, 1955   2 Sheets-Sheet 1
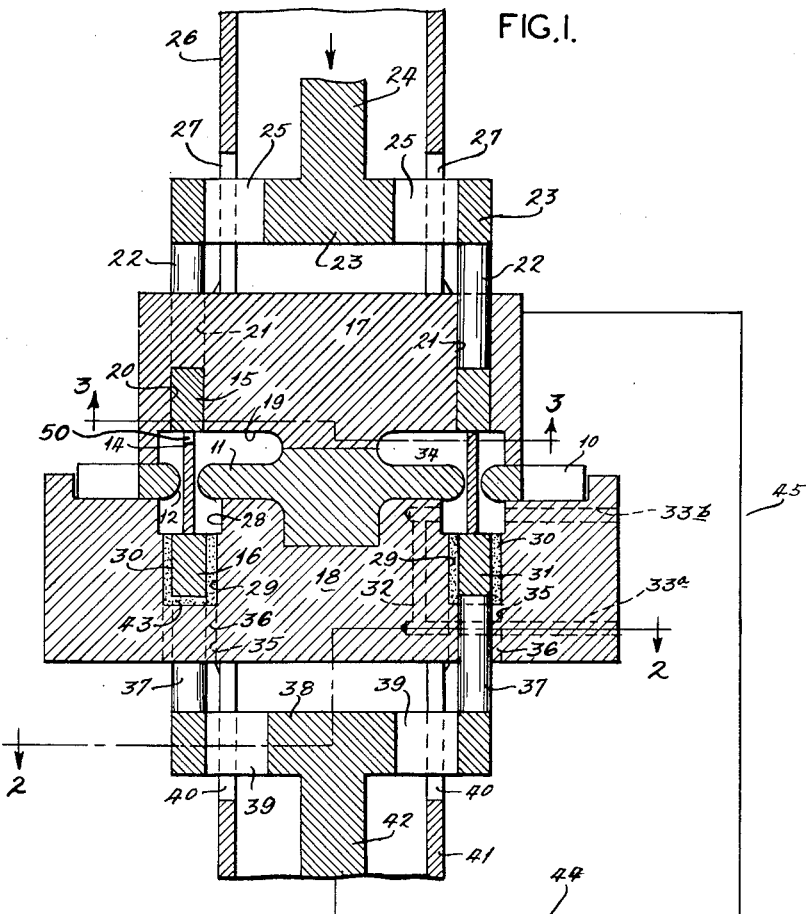
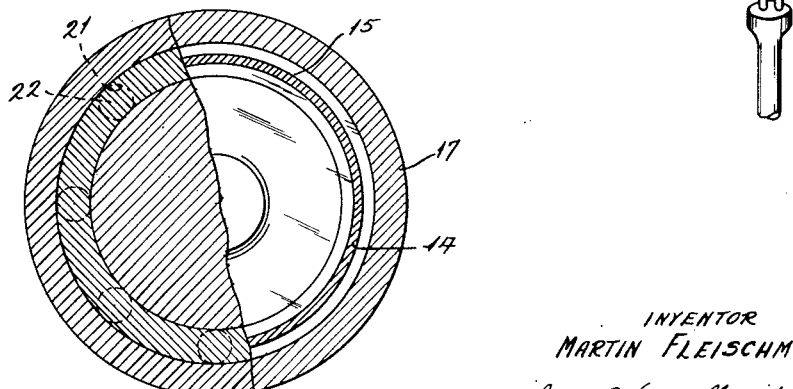
INVENTOR
MARTIN FLEISCHMANN
By Gravely, Lieder, Woodruff and Wells
ATTORNEYS, Dec. 10, 1957 M. FLEISCHMANN 2,816,212
ELECTRIC WELDING APPARATUS
Filed May 4, 1955 2 Sheets-Sheet 2

INVENTOR
MARTIN FLEISCHMANN
By Gravely, Lieder, Woodruff and Wills
ATTORNEYS.

_United States Patent Office_

2,816,212
Patented Dec. 10, 1957

2,816,212

ELECTRIC WELDING APPARATUS

Martin Fleischmann, Canton, Ohio, assignor to The Timken Roller Bearing Company, Canton, Ohio, a corporation of Ohio Application May 4, 1955, Serial No. 506,016

8 Claims. (Cl. 219—106)

The present invention relates generally to a device for welding and particularly to electrical welding devices adaptable for mass produced welding.

A principal object of the present invention is to provide an electrical welding apparatus in which the welding material is heated and pressed between the surfaces to be welded.

Another major object of the present invention is the provision of an electrical welding apparatus wherein high resistance welding material is confined during welding in an inert gas to prevent oxidation.

Another object of the present invention is to provide a welding apparatus that is suitable for mass production.

Another object of the present invention is to provide a weld that is free from oxidation.

Another object of the present invention is to provide a welding apparatus that distributes heat evenly throughout the welding material.

Another object of the present invention is to provide an electrical welding device wherein the electrical conducting means also serve to press the welding material between the surfaces to be welded.

Another object of the present invention is to provide a welding device in which the welding material has high resistance to the flow of electricity for producing heat.

Another object of the present invention is the provision of a welding method which provides for heating of the members to be welded as well as the welding material to improve the weld.

Figure 2:
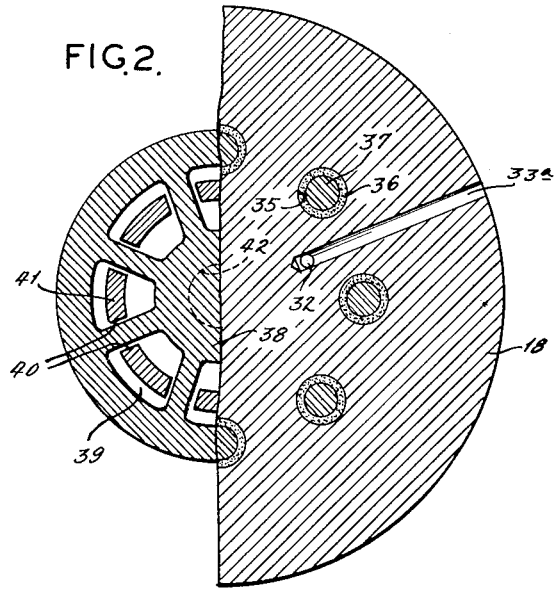
Figure 4:
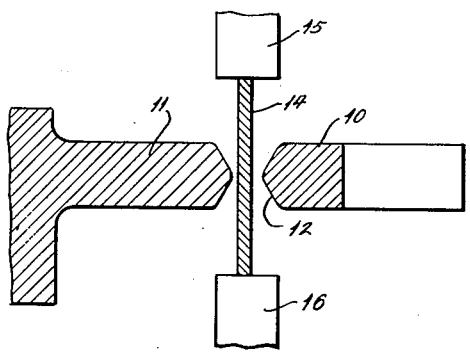
Figure 5:
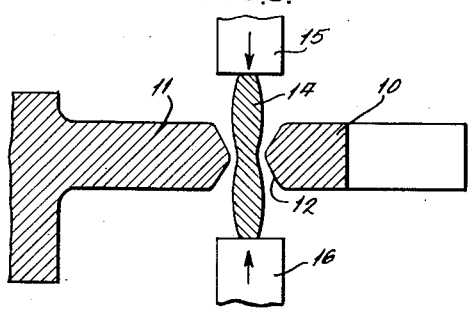
Figure 6:
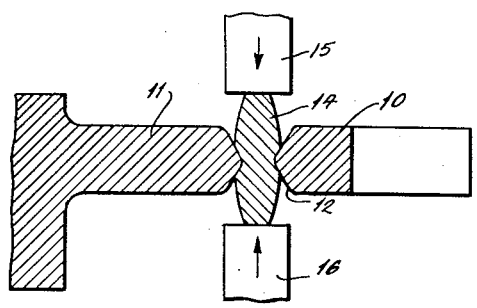
Figure 7:
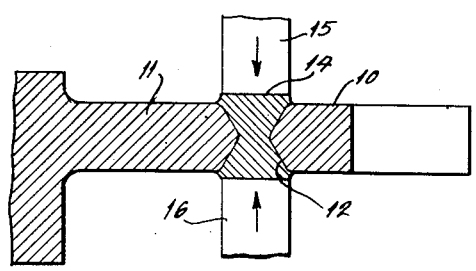

Other objects and advantages of the present invention will become apparent by reference to the following detailed description in conjunction with the accompanying drawings of which:

Fig. 1 is a cross sectional view in elevation showing in detail the arrangement of parts for a device constructed in accordance with the teachings of the present invention, Fig. 2 is a cross sectional view on line 2—2 of Fig. 1, Fig. 3 is a cross sectional view on line 3—3 of Fig. 1, Fig. 4 is a fragmentary sectional view showing the resistance welding material being held in position by conductor means between the members to be welded prior to being compressed, Fig. 5 is a fragmentary sectional view showing the welding material partially compressed during welding, Fig. 6 is a fragmentary sectional view showing the welding material compressed to partially engage the members being welded, and Fig. 7 is a fragmentary sectional view showing the welding material fully compressed.

Referring to the drawings in detail, the members 10 and 11 of Fig. 1 refer to the members that are to be welded together. For illustrative purposes the member 10 is shown as having a circular opening 12, and the member 11 is shown as a circular hub having a diameter slightly smaller than the diameter of the opening 12. The hub member 11 is supported centrally in the opening 12 of member 10 for welding as hereinafter described.

Positioned in the space between members 10 and 11 is a thin wall or tube 14 of welding alloy having a high resistance to the flow of electricity. The alloy tube 14 is composed of a suitable welding material that will yield to any desired shape when properly heated.

Supporting the welding alloy tube 14 are two electrodes 15 and 16 which are tubular in shape and act to engage opposite ends of the alloy tube 14. When a voltage difference is impressed between the electrodes 15 and 16, current will flow through the wall of the tube 14. The welding tube 14 has high resistance to the flow therethrough of electric current, and the heat generated therein by the electric current will cause the welding alloy tube 14 to soften.

Two holding plates 17 and 18 support the hub 11 in the opening 12 so that no relative movement will take place between the members 10 and 11, and slidably support the electrodes 15 and 16. The holding plate 17, shown above the hub 11, has an annular groove 19 that surrounds the upper end of the welding alloy tube 14. Extending upwardly from the groove 19 is another and deeper annular groove 20 that is axially aligned with and centrally located above the alloy tube 14. The annular groove 20 slidably positions the annular electrode 15. Spaced about the upper electrode 15 and extending upwardly through bores 21 in the top of the plate 17 are a plurality of plunger rods 22 which connect the annular electrode 15 with an upper pressure plate 23. Positions for eight of the plunger rods 22 are shown in Fig. 3.

The upper pressure plate 23 is connected to a ram 24 which is movable in a vertical direction by suitable ram means (not shown) so that the plate 23 and the plungers 22 move up and down.

Openings 25 in the form of slots are provided in the upper pressure plate 23 so that a cylindrical tube 26 that surrounds the shaft 24 and is connected at its lower end to the positioned plate 17, is movable vertically relative to plate 23. Relative movement between the plate 23 and tube 26 is possible because downwardly opening slots 27 in the tube 26 are provided in alternate spaced relationship with the slotted openings 25.

Below the members 10 and 11 is the positioning plate 18 which has a function similar to plate 17 with several important differences. An annular groove 28 surrounds the lower end of the welding alloy tube 14 and extending downwardly from the groove 28 is a deeper annular groove 29 which is vertically aligned with the welding tube 14. The groove 29 receives an annular shaped insulator 30 having an annular channel 31 opening upwardly.

The lower electrode 16 is slidably positioned in the channel 31 in insulator 30 so that the electrode 16 is capable of vertical movement relative to the insulator 30.

Extending downwardly from the annular groove 29 through the positioning plate 18 are a plurality of spaced bores 35, positions for eight being shown in Fig. 2. The bores 35 carry tubular or sleeve-like insulators 36 in which are slidably located plunger rods 37. The rods 37 are attached to the lower electrode 16 through cooperating openings 43 in the lower side of insulator 30 and to a lower pressure plate 38 so that vertical movement of the plate 38 causes vertical movement of the plungers 37 and the annular electrode 16.

The lower pressure plate 38 below positioning plate 18 is provided with slotted openings 39 in alternate relation with upwardly directed slotted openings 40 in a lower tubular shaft 41. The shaft 41 is fastened to the lower side of plate 18. The tubular shaft 41 circumscribes a ram 42 that extends downward from the pressure plate 38. The slotted openings 39 and 40 permit relative movement vertically between the positioning plate 18 and the pressure plate 38 in a manner similar to that described in connection with plate 17.

The non-grounded side of a grounded power supply is connected by a wire 44 to the lower electrode 16 by connecting it to the shaft 42 or any other part common to electrode 16, and the grounded side of the power supply is connected by suitable means such as a wire 45 to the plate 17 or some point electrically common therewith.

A plurality of passages 32, 33a and 33b, shown as drilled passages in Fig. 1, are provided in the positioning plate 18. These connecting passages give access to a confined annular enclosure 34 formed about the alloy tube 14, the enclosure 34 being constituted by the grooves 19 and 28 when the upper and lower positioning plates 17 and 18 respectively are in the position shown in Fig. 1. The purpose for these passages is to permit supplying an inert gas into the enclosure 34 while at the same time exhausting the air therein. The gas may be supplied through passages 33a and 32, halfway around the inner portion of enclosure or chamber 34, through a notch 50 formed in the edge of the alloy tube 14, back around the outer portion of the chamber 34, and air will then be expelled at passage 33b.

Figs. 4, 5, 6 and 7 illustrate in sequence the operation of the upper electrode 15 and the lower electrode 16 as a weld is performed on members 10 and 11.

In Fig. 4 the electrodes 15 and 16 are in the initial position wherein an electric path is established from electrode 16 through the alloy tube 14 to electrode 15. When the passage of electricity has sufficiently heated the wall of tube 14, and by radiation has also heated the faces of the parts 10 and 11 to be joined, the electrodes 15 and 16 are moved toward each other. Fig. 5 shows the wall of tube 14 slightly compressed but not yet engaged with members 10 and 11. Fig. 6 shows the wall of tube 14 engaged with both members 10 and 11, thereby conducting heat to said members by contact therewith so that they are heated to a temperature suitable for completing the weld. Fig. 7 shows the electrodes 15 and 16 when the weld is completed and the electrodes are ready to separate to allow the weld to cool.

*Operation*

When it is desired to weld the member 11 into the opening 12 of the member 10 the upper and lower positioning plates 17 and 18 are backed away from each other to provide clearance for positioning the members 10 and 11 on the lower positioning plate 18. The welding alloy tube 14 is then positioned in the space between the members 10 and 11 where it is supported on the lower electrode 16. The positioning plates 17 and 18 are next moved toward each other so that the welding alloy tube 14 also engages the upper electrode 15 and is fully confined in the enclosure 34.

A supply of inert gas is fed into the enclosure or chamber 34 by either passage 33a or 33b and passage 32, and the air that was in the enclosure 34 is exhausted through the other passage. Providing inert gas into the enclosure 34 serves to prevent oxidation of the alloy tube 14 and the members 10 and 11 during the resistance welding process.

Electric energy is applied to the lower electrode 16 from the wire 44 which is connected at the other end to an electric power supply. The other side of the power supply is grounded to the upper positioning plate 17 by the wire 45 causing a voltage to exist between the lower electrode 16 and all of the other members that are common with the plate 17. Therefore, the path of the electric current will be from the lower electrode 16, through the welding alloy tube 14, to electrode 15 and to ground through plate 17 during the heating stages shown in Figs. 4, 5 and 6.

The type of welding alloy used and the strength of the electric power supply determines the length of time that electricity should be applied in order to properly heat the welding tube 14 for welding. When the proper heat is reached the upper and lower electrodes 15 and 16 are moved toward each other by a suitable force applied to the rams 24 and 42 causing the welding alloy tube 14 to be deformed or upset and pressed into a final weld as shown in Fig. 7. Intermediate shapes for the wall of the welding alloy tube 14 between the initial shape and the final weld are shown in Figs. 5 and 6. Having completed the weld the position plates 17 and 18 are separated and the welded members removed to cool.

In the above description and operation the parts were referred to as respects their locations in the accompanying drawings. The present device, however, could be operated at any angle and is not limited to vertical operation. Furthermore, the invention is not to be restricted to circular shaped members, but may be used for straight or odd shaped parts. Any suitable apparatus or device may be used to accomplish electric resistance welding as described in this specification so long as the spirit of the invention is not departed from.

What is claimed is:

1. A welding apparatus comprising means adapted for positioning members to be welded, electrical conductor means slidably located in the positioning means and connected to a source of electric energy, and moving means for moving the conductor means relative to the members to be welded for deforming at least one of the members into welded engagement with the other members.

2. A welding apparatus comprising positioning means adapted for positioning members to be welded in spaced relation to each other, electrical conductor means slidably located in the positioning means and connected to a source of electric energy, means for moving the conductor means relative to the members to be welded for upsetting at least one of the members into welding engagement with the other members, and chamber means in the positioning means adjacent the members to be welded adapted to be connected to a source of inert gas.

3. An electric welding apparatus comprising means for positioning the members to be welded in spaced relation to each other, electric conductor means slidably located in the positioning means and connected to an electric supply, said electric conductor means adapted for supporting a wall of high resistance welding material between the members to be welded, and means for moving the conductor means and the positioning means relative to the members to be welded and to each other.

4. An electric welding apparatus comprising cooperating positioning means for positioning the members to be welded in spaced relation, electric conductor means slidably located in the positioning means and connected to an electric supply, chamber means in said cooperating positioning means adapted to be connected to a source of inert gas, and means for moving the conductor means and the positioning means relative to the members to be welded and to each other.

5. An apparatus for electric welding comprising conductor means connected to a source of electric energy for electrically heating and supporting a high resistance welding material between members to be welded, positioning means having chamber means for slidably supporting the conductor means and supporting the members to be welded in spaced relation so that the welding material is positioned in the chamber means, means adapted to connect the chamber means with a source of inert gas, and means for moving the conductor means and the positioning means relative to the members to be welded and relative to each other.

6. An apparatus for electric welding comprising positioning means for locating a wall of high resistance welding material between members to be welded, conductor means connected to a source of electric energy and adapted to engage and support the wall of welding material between the members to be welded, said positioning means movably positioning the conductor means and including chamber means adapted to be connected to a source of inert gas, and means for moving the conductor means and the positioning means relative to the members to be welded and relative to each other.

7. An electric welding apparatus adapted for mass produced welding comprising positioning means for locating a wall of high resistance welding alloy between members to be welded, conductor means slidably positioned in the positioning means for engaging the wall of welding alloy and connected to a source of electric energy, chamber means in the positioning means vertically disposed relative to the members to be welded and located so that the welding alloy wall is confined therein, means in said positioning means adapted to connect the chamber means with a supply of inert gas, and means for moving the conductor means and the positioning means vertically relative to the members to be welded and relative to each other.

8. A method of electric resistance welding of two members together including positioning the members to be welded in spaced relation to each other, positioning high resistance welding material between the members in spaced relation thereto, electrically heating and upsetting the welding material into contact with the members to be welded, radiantly heating the members to be welded during the electrical heating of the welding material, continuing heating the members to be welded through the contact with the upset welding material, and performing the heating and upsetting steps in an inert gas atmosphere.

References Cited in the file of this patent

UNITED STATES PATENTS

| | | |
|---|---|---|
| 419,032 | Coffin | Jan. 7, 1890 |
| 686,558 | Thomson | Nov. 12, 1901 |
| 1,022,712 | Thomson | Apr. 9, 1912 |
| 1,640,798 | Murray | Aug. 30, 1921 |
| 1,674,109 | Grob | June 19, 1928 |

FOREIGN PATENTS

| | | |
|---|---|---|
| 614,746 | France | Sept. 24, 1926 |